United States Patent
Barnes et al.

(10) Patent No.: US 8,811,749 B1
(45) Date of Patent: Aug. 19, 2014

(54) DETERMINING CORRESPONDENCE BETWEEN IMAGE REGIONS

(75) Inventors: Connelly Barnes, Corvallis, OR (US); Dan Goldman, Seattle, WA (US); Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 152 days.

(21) Appl. No.: 13/607,965

(22) Filed: Sep. 10, 2012

Related U.S. Application Data

(63) Continuation of application No. 12/394,280, filed on Feb. 27, 2009, now Pat. No. 8,285,055, and a continuation of application No. 12/315,038, filed on Nov. 26, 2008, now Pat. No. 8,407,575.

(60) Provisional application No. 61/191,594, filed on Sep. 10, 2008.

(51) Int. Cl.
*G06K 9/66* (2006.01)

(52) U.S. Cl.
USPC ............ 382/195; 382/108; 382/199; 382/218; 382/278

(58) Field of Classification Search
USPC .......... 382/108, 195, 199, 218, 278; 380/270, 380/277; 370/258, 403, 410; 345/629; 435/325, 366, 374; 600/508, 509, 523; 715/201, 204; 726/11, 14; 455/11.1, 455/12.1, 13.1
See application file for complete search history.

(56) References Cited

U.S. PATENT DOCUMENTS

| | | | |
|---|---|---|---|
| 5,649,032 A | 7/1997 | Burt et al. | |
| 6,018,592 A | 1/2000 | Shinagawa et al. | 382/195 |
| 6,263,088 B1 | 7/2001 | Crabtree et al. | 307/64 |
| 6,347,152 B1 | 2/2002 | Shinagawa et al. | 352/195 |
| 6,396,500 B1 | 5/2002 | Qureshi | |
| 6,987,520 B2 | 1/2006 | Criminisi et al. | 345/619 |
| 7,088,870 B2 | 8/2006 | Perez et al. | 382/284 |
| 7,336,851 B1 | 2/2008 | Cote | 382/282 |
| 7,760,912 B2 | 7/2010 | Dana et al. | 382/108 |
| 7,773,099 B2 | 8/2010 | Forlines et al. | 345/629 |
| 7,826,683 B2 | 11/2010 | Phillips | 382/276 |
| 8,139,850 B2 | 3/2012 | Maxwell et al. | 382/164 |
| 8,139,867 B2 | 3/2012 | Maxwell et al. | 382/199 |
| 8,285,055 B1 * | 10/2012 | Barnes et al. | 382/195 |

(Continued)

OTHER PUBLICATIONS

"Non-Final Office Action", U.S. Appl. No. 12/315,038, (May 10, 2012), 11 pages.

(Continued)

*Primary Examiner* — Anh Do
(74) *Attorney, Agent, or Firm* — Wolfe-SBMC

(57) ABSTRACT

Determining correspondence between image regions includes identifying first and second regions of visual content including pixels in a computer system. The first region includes a first patch of pixels having a first mapping to a second patch of pixels in the second region. Iterative evaluations of the first and second regions are performed, each including at least (i) a first evaluation phase selecting a best mapping for the first patch, according to a distance metric, the best mapping selected from among the first mapping and a second mapping obtained from mappings of nearby pixels, and (ii) a second evaluation phase selecting one of the best mapping and a third mapping obtained by perturbing the second mapping. A result of the iterative evaluations is recorded in the computer system that indicates a third patch of pixels in the second region identified in the iterative evaluations.

18 Claims, 4 Drawing Sheets

(56) References Cited

U.S. PATENT DOCUMENTS

| | | | |
|---|---|---|---|
| 8,407,575 B1 | 3/2013 | Goldman et al. | |
| 8,478,393 B2* | 7/2013 | Ramanathan et al. | 600/523 |
| 8,571,328 B2* | 10/2013 | Shechtman et al. | 382/218 |
| 8,625,927 B2* | 1/2014 | Shechtman et al. | 382/278 |
| 2003/0099406 A1 | 5/2003 | Georgiev et al. | 382/254 |
| 2004/0164996 A1 | 8/2004 | Criminisi et al. | 345/619 |
| 2005/0128210 A1 | 6/2005 | Berger | 345/582 |
| 2005/0128211 A1 | 6/2005 | Berger et al. | 345/582 |
| 2005/0220348 A1 | 10/2005 | Chiu et al. | 382/103 |
| 2006/0120624 A1 | 6/2006 | Jojic et al. | 715/720 |
| 2006/0284874 A1 | 12/2006 | Wilson | 345/175 |
| 2006/0285762 A1 | 12/2006 | Sun et al. | 382/254 |
| 2007/0025637 A1 | 2/2007 | Setlur et al. | 382/173 |
| 2008/0112642 A1 | 5/2008 | Matsushita et al. | 375/240.16 |
| 2008/0238942 A1 | 10/2008 | Sun et al. | 345/634 |
| 2008/0238945 A1 | 10/2008 | Wakizaka | 345/661 |
| 2008/0292162 A1 | 11/2008 | Gering et al. | 382/128 |
| 2009/0141992 A1 | 6/2009 | Coulombe et al. | 382/239 |
| 2009/0180713 A1 | 7/2009 | Bucha et al. | 382/300 |
| 2010/0183242 A1 | 7/2010 | Brand | 382/282 |
| 2010/0287511 A1 | 11/2010 | Meier et al. | 345/633 |
| 2010/0289817 A1 | 11/2010 | Meier et al. | 345/632 |
| 2010/0328352 A1 | 12/2010 | Shamir et al. | 345/661 |
| 2011/0182502 A1 | 7/2011 | Liang | 382/298 |

OTHER PUBLICATIONS

"Non-Final Office Action", U.S. Appl. No. 12/315,038, (May 25, 2012), 12 pages.

"Non-Final Office Action", U.S. Appl. No. 12/394,280, (May 10, 2012), 5 pages.

"Notice of Allowance", U.S. Appl. No. 12/315,038, (Nov. 20, 2012), 12 pages.

"Notice of Allowance", U.S. Appl. No. 12/394,280, (Jun. 8, 2012), 7 pages.

"Restriction Requirement", U.S. Appl. No. 12/315,038, (Oct. 7, 2011), 6 pages.

Hirakawa, Masahito et al., "Content-Based Video Retrieval Using Mosaic Images ", *Proceedings of the First International Symposium on Cyber Worlds (CW '02)*, (2002), 7 pages.

'phpFlicke' [online]. "phpFlickr version 3.1," Jan. 2011, [retrieved on Jan. 26, 2012]. Retrieved from the Internet: <URL: http://phpflickr.com>. 4 pages.

'Web-Archive' [online]. "Creative Commons," 2010, [retrieved on Jan. 26, 2012]. Retrieved from Internet: <URL: http://web.archive.org/web/20100130095204/http:/creativecommons.org/> . 3 pages.

'Wikipedia' [online]. "Java (programming language)," 2002, [retrieved on Jan. 27, 2012]. Retrieved from the Internet: <URL: http://en.wikipedia.org/w/index.php?title=Java_(programming_language)&oldid=550214>. 7 pages.

'Wikipedia' [online]. "OpenGL," Dec. 2004, [retrieved on Jan. 27, 2012]. Retrieved from the Internet <URL: http://en.wikipedia.org/w/index.php?title=OpenGL&oldid=9281664>. 3 pages.

"AutoCollage" [online]. Microsoft Research 2008, [retrieved on Nov. 26, 2008]. Retrieved from the Internet: <URL: http://research.microsoft.com/autocollage/>.

Agarwala, A., Dontcheva, M., Agrawala, M., Drucker, S., Colburn, A., Curless, B., Salesin, D., and Cohen, M., "Interactive digital photomontage", *ACM Trans. Graph. 23*, 3, pp. 294-302, dated 2004.

Arya, S., Mount, D., Netanyahu, N., Silverman, R., and Wu, A., "An optimal algorithm for approximate nearest neighbor searching in fixed dimensions", in *Proc. Fifth Symp. Discrete Algorithms (SODA)*, pp. 573-582, dated 1994.

Ashikhmin, M., "Synthesizing natural textures", in *I3D '01 Proceedings of the 2001 symposium on Interactive 3D graphics*, ACM, New York, NY, USA, pp. 217-226, dated 2001.

Avidan, S., and Shamir, A., "Seam carving for content-aware image resizing", in *ACM Trans. Graph.* 26, 3, 10, dated 2007.

Baker, S. and Kanade, T. "Limits on Super-Resolution and How to Break Them." IEEE Transactions on Pattern Analysis and Machine Intelligence, vol. 24, No. 9, Sep. 2002, 36 pages.

Barnes, et al., "Supplementary Material for The Generalized PatchMatch Correspondence Algorithm", Downloaded from the internet at http://www.cs.princeton.edu/gfx/pubs/Barnes_2010_TGP/index.php on Sep. 9, 2010, 6 pages.

Barnes, et al., "The Generalized PatchMatch Correspondence Algorithm", Downloaded from the internet at http://www.cs.princeton.edu/gfx/pubs/Barnes_2010_TGP/index.php on Sep. 9, 2010, 14 pages.

Bay et al. "SURF: Speeded Up Robust Features." Computer Vision and Image Understanding (CVIU), vol. 110, No. 3, 2008, 14 pages.

Bertalmio, M., Sapiro, G., Caselles, V., and Ballester, C., "Image inpainting", in *SIGGRAPH '00: Proceedings of the $27^{th}$ annual conference on computer graphics and interactive techniques*, ACM Press/Addison-Wesley Publishing Co., New York, NY, USA, pp. 417-424, dated 2000.

Boiman et al. "In Defense of Nearest-Neighbor Based Image Classification." Academic Paper, The Weizmann Institute of Science, Jun. 2008, 8 pages.

Bourdev and Brandt, "Robust Object Detection Via Soft Cascade" in *Proceedings from CVPR 2005, IEEE Computer Society*, pp. 2236-2243.

Boykov, Y., Veksler, O., and Zabih, R., "Fast approximate energy minimization via graph cuts", in *Pattern Analysis and Machine Intelligence, IEEE Transactions on 23*,11 (Nov), pp. 1222-1239, dated 2001.

Buades, A., Coll, B., and Morel, J.M. 2005. A non-local algorithm for image denoising. In *Computer Vision and Pattern Recognition, 2005. CVPR 2005. IEEE Computer Society Conference on*, vol. 2, 60-65 vol. 2.

Chang et al. "Super-Resolution Through Neighbor Embedding." Computer Vision and Pattern Recognition, 2004. CVPR 2004. Proceedings of the 2004 IEEE Computer Society Conference, Jul. 2004, 8 pages.

Chen et al. "Sketch2Photo: Internet Image Montage." ACM Transactions on Graphics (TOG)—Proceedings of ACM SIGGRAPH Asia 2009, Dec. 2009, 10 pages.

Cho, T. S., Butman, M., Avidan, S., and Freeman, W., "The patch transform and its applications to image editing", in *Computer Vision and Pattern Recognition, 2008. CVPR 2008. IEEE Conference on* (June), pp. 1-8, dated 2008.

Criminisi, A., Perez, P., and Toyama, K. 2003. Object removal by exemplar-based inpainting. *Computer Vision and Pattern Recognition IEEE, Computer Society Conference on 2*, 721.

Criminisi, A., Perez, P., and Toyama, K., "Region filling and object removal by exemplar-based image inpainting", in *IEEE Trans. Image Processing 13*, 9 (Sept.),p. 1200-1212, dated 2004.

Dale et al. "Image Restoration using Online Photo Collections." Proc. IEEE Conference on Computer Vision, Sep. 2009, 8 pages.

Datar, Immorlica, Indyk, and Mirrokni, "Locality-sensitive hashing scheme based on p-stable distributions", in *COMPGEOM: Annual ACM Symposium on Computational Geometry*, dated 2004.

Drori, I., Cohen-or, D., and Yeshurun, H., 2003. Fragment-based image completion. *ACM Transactions on Graphics 22*, 303-312.

Efros, A. A., and Freeman, W.T., "Image quilting for texture synthesis and transfer", in *SIGGRAPH 2001, Computer Graphics Proceedings*, ACM Press/ACM SIGGRAPH, E. Fiume, Ed., pp. 341-346, dated 2001.

Efros, A. A., and Leung, T. K., "Texture synthesis by non-parametric sampling", in *Computer Vision, IEEE International Conference on 2*, p. 1033, dated 1999.

Eisemann et al. "Photo Zoom: High Resolution from Unordered Image Collections." SIGGRAPH 2010, Los Angeles, California, May 2010, 1 page.

Fischler, M.A., and Bolles, R.C., 1981. Random sample consensus: a paradigm for model fitting with applications to image analysis and automated cartography. *Commun. ACM 24*, 6, 381-395.

Fitzgibbon, A., Wexler, Y., and Zisserman, A., 2003. Image-based rendering using image-based priors. In ICCV '03: *Proceedings of the Ninth IEEE International Conference on Computer Vision*, IEEE Computer Society, Washington, DC, USA 1176.

Freeman, W. T., Pasztor, E. C., and Y, O. T. C., "Learning low-level vision", in *International Journal of Computer Vision 40*, dated 2000.

(56) References Cited

OTHER PUBLICATIONS

Freeman, W., Jones, T., and Pasztor, E. 2002. Example-based super-resolution. *Computer Graphics and Applications, IEEE 22*, 2(Mar/Apr) 56-65.
HaCohen et al. "Image Upsampling via Texture Hallucination." IEEE International Conference on Computational Photography, Mar. 2010, 8 pages.
Han et al. "Multiscale Texture Synthesis." ACM Transactions on Graphics, vol. 27, No. 3, Aug. 2008, 8 pages.
Hays and Efros. "Scene Completion Using Millions of Photographs." SIGGRAPH 2007, San Diego, California, Aug. 2007, 7 pages.
Hertzmann, A., Jacobs, C. E., Oliver, N., Curless, B., and Salesin, D., "Image analogies", in *SIGGRAPH*, pp. 327-340, dated 2001.
Johnson et al. "CG2Real: Improving the Realism of Computer Generated Images Using a Large Collection of Photographs." IEEE Transactions on Visualization and Computer Graphics, vol. 17, No. 6, Sep. 2011, 13 pages.
Kaneva et al. "Infinite Images: Creating and Exploring a Large Photorealistic Virtual Space." Proceeding of the IEEE, vol. 98, No. 8, Aug. 2010, 17 pages.
Kirkpatrick et al. "Optimization by Simulated Annealing." Science, vol. 220, No. 4598, May 1983, 10 pages.
Komodakis, N., and Tziritas, G. 2007, Image completion using efficient belief propagation via priority scheduling and dynamic pruning. *IEEE Transactions on Image Processing 16*, 11, 2649-2661.
Kopf, J., Fu, C.-W., Cohen-Or, D., Deussen, O., Lischinski, D., and Wong, T.-T. 2007. Solid texture synthesis from 2d exemplars. *ACM Transactions on Graphics (Proceedings of SIGGRAPH 2007)* 26, 3, 2:1-2:9.
Kumar, N., Zhang, L., and Nayar, S.K., "What is a good nearest neighbors algorithm for finding similar patches in images?", in *European Conference on Computer Vision, II*: pp. 364-378, dated 2008.
Kwatra V., Schdl, A., Essa, I., Turk, G., and Bobick, A., "Graphcut textures: Image and video synthesis using graph cuts", in *ACM Transactions on Graphics, SIGGRAPH 2003* 22, 3 (July), pp. 277-286, dated 2003.
Kwatra, V., Essa, I., Bobick, A., Kwatra N., "Texture optimization for example-based synthesis", in *ACM Trans. Graph.*, 24(3): pp. 795-802, dated 2005.
Lefebvre, S., and Hoppe, H., "Parallel controllable texture synthesis", in *ACM Trans. Graph 24, 3*, pp. 777-786, dated 2005.
Liang, L., Liu, C., Xu, Y.-Q., Guo, B., and Shum, H.-Y., "Real-time texture synthesis by patch-based sampling" in *ACM Trans. Graph. 20*, 3, pp. 127-150, dated 2001.
Lin, et al. "Random Forests and Adaptive Nearest Neighbors", Technical Report No. 1055, Downloaded from the Internet on Sep. 7, 2010 at www.stat.wisc.edu/Department/techreports/tr1081.pdf; May 29, 2002, 31 pages.
Liu et al. "Face Hallucination: Theory and Practice." International Journal of Computer Vision (IJCV), vol. 75, No. 1, Oct. 2007, 33 pages.
Liu, F., and Gleicher, M., "Automatic image retargeting with fisheye-view warping", in *UIST, ACM, P. Baudisch, M Czerwinski and D.R. Olsen, Eds.*, pp. 153-162, dated 2005.
Liu, X., Mei, T., Hua, X.-S., Yang, B., and Zhou, H.-Q., "Video Collage", in *MM'07*, pp. 461-462, dated 2007.
Lowe, D.G. "Object Recognition from Local Scale-Invariant Features." Computer Vision, 1999. The Proceedings of the Seventh IEEE International Conference, Kerkyra, Greece, Sep. 1999, 8 pages.
Mikolajczyk, K., and Matas, J. G., "Improving descriptors for fast tree matching by optimal linear projection", in *International Conference on Computer Vision*, pp. 1-8, dated 2007.
Miranda et al. "New Routes from Minimal Approximation Error to Principal Components." Neural Processing Letters, vol. 27, No. 3, Jun. 2008, 14 pages.
Mount, D.M., and Arya, S., "ANN: A library for approximate nearest neighbor searching", dated Oct. 28, 1997.
Pandey et al. "Nearest-Neighbor Caching for Content-Match Applications." International World Wide Web Conference Committee (IW3C2), Madrid, Spain, Apr. 2009, 10 pages.
Pavic, D., Schonefeld, V., and Kobbelt, L. 2006. Interactive image completion with perspective correction. *The Visual Computer 22* (September), 671-681(11).
Peterson, J. L. "Computer Programs for Detecting and Correcting Spelling Errors." Computing Practices: Communications of the ACM, vol. 23, No. 12, Dec. 1980, 12 pages.
Rong, G., and Tan, T.-S., "Jump flooding in gpu with applications to voronoi diagram and distance transform", in *I3D '06: Proceedings of the 2006 symposium on Interactive 3D graphics and games*, ACM, New York, NY, USA, pp. 109-116, dated 2006.
Rother, C., Bordeaux, L., Hamadi, Y., and Blake, A., "Autocollage", in *ACM Trans. Graph 25*, 3, pp. 847-852, dated 2006.
Rother, C., Kumar, S., Kolmogorov, V., and Blake, A., "Digital tapestry", in *IEEE Computer Vision and Pattern Recognition or CVPR, I*, pp. 589-596, dated 2005.
Rubinstein, M., Shamir, A., and Avidan, S., "Improved seam carving for video retargeting", in *ACM Transactions on Graphics (SIGGRAPH)* 27, 3, dated 2008.
Setlur, V., Takagi, S., Raskar, R., Gleicher, M., and Gooch, B., "Automatic image retargeting", in *MUM, ACM, M. Billinghurst, Ed., vol. 154 of ACM International Conference Proceeding Series*, pp. 59-68, dated 2005.
Shiratori, T., Matsushita, Y., Tang, X., and Kang, S. B., "Video completion by motion field transfer", in *Computer Vision and Pattern Recognition, 2006 IEEE Computer Society Conference on 1* (June), pp. 411-418, dated Jun. 2006.
Simakov, D., Caspi, Y., Shechtman E., and Irani, M., "Summarizing visual data using bidirectional similarity", in *Proc. IEEE Conference on Computer Vision and Pattern Recognition (CVPR)*, pp. 1-8, dated 2008.
Snavely et al. "Photo Tourism: Exploring Photo Collections in 3D." ACM Transactions on Graphics (SIGGRAPH Proceedings), vol. 25, No. 3, Jul. 2006, 12 pages.
Sun, J., Yuan, L., Jia, J., and Shum, H.-Y. 2005. Image completion with structure propagation. In *SIGGRAPH '05:ACM SIGGRAPH 2005 Papers*, ACM, New York, NY, USA 861-868.
Tong, X., Zhang, J., Liu, L., Wang, X., Guo, B., and Shum, H.-Y., "Synthesis of bidirectional texture functions on arbitrary surfaces", in *ACM Transactions on Graphics 21, 3* (July), pp. 665-672, dated Jul. 2002.
Tourapis, A. M., "Enhanced predictive zonal search for single and multiple frame motion estimation", in *VCIP, SPIE, C. C. J Kuo, Ed., vol. 4671 of Proceedings of SPIE*, pp. 1069-1079, dated 2002.
Wang et al. "Factoring Repeated Content Within and Among Images." ACM Trans. on Graphics (SIGGRAPH), vol. 27, No. 3, Aug. 2008, 10 pages.
Wang, T., Mei, T., Hua, X.-S., Liu, X., and Zhou, H.-Q., "Video collage: A novel presentation of video sequence", in *ICME, IEEE*, pp. 1479-1482, dated 2007.
Wang, Y.-S., Tai, C.-L., Sorkine, O., and Lee, T.-Y. 2008. Optimized scale-and-stretch for image resizing. In *siggraph asia '08: ACM SIGGRAPH Asia 2008 papers*, ACM, New York, NY, USA, 1-8.
Webb, A. R. "Chapter 6. Nonlinear Discriminant Analysis—Projection Methods." Statistical Pattern Recognition, Jul. 2009, 22 pages.
Wei, L. Y., and Levoy, M., "Fast texture synthesis using tree-structured vector quantization", in *SIGGraph-00*, pp. 479-488, dated 2000.
Wei, L.-Y., Han, J., Zhou, K., Bao, H., Guo, B., and Shum, H.-Y., "Inverse texture synthesis", in *ACM Trans. Graph 27, 3*, pp. 1-9, dated 2008.
Wexler, Y., Shechtman, E., and Irani, M., "Space-time completion of video", in *IEEE Trans. Pattern Analysis and Machine Intelligence 29, 3*, (Mar.), pp. 463-476, dated Mar. 2007.
Wexler, Y., Shechtman, E., and Irani, M., "Space-time video completion", in *Computer Vision and Pattern Recognition, IEEE Computer Society Conference on 1*, pp. 120-127, dated 2004.
Wolf, L., Guttmann, M., and Cohen-Or, D., 2007. Non-homogeneous content-driven video-retargeting. In *Proceedings of the Eleventh IEEE International Conference on Computer Vision (ICCV-07)*.
Yianilos, P.N., "Data structures and algorithms for nearest neighbor search in general metric spaces", in *SODA*, pp. 311-321, dated 1993.

\* cited by examiner

DETERMINING CORRESPONDENCE BETWEEN IMAGE REGIONS

CROSS-REFERENCE TO RELATED APPLICATIONS

This application claims priority from U.S. Provisional Application Ser. No. 61/191,594 filed Sep. 10, 2008, and entitled "Video Content Summary" the contents of which are incorporated herein by reference. This application also claims priority as a continuation of U.S. application Ser. No. 12/315,038, filed Nov. 26, 2008, and entitled "Video Content Summary" the contents of which are incorporated herein by reference. This application also claims priority as a continuation of U.S. application Ser. No. 12/394,280 filed Feb. 27, 2009, and entitled "Determining Correspondence Between Image Regions," the contents of which are incorporated herein by reference.

BACKGROUND

This specification relates to digital graphics data processing.

Image likeness, such as a correspondence between regions of one or more images, can be defined in many different implementations that depend on such correspondences. For example, this can include algorithms for correspondence in computer vision, such as wide baseline stereo matching and motion tracking, and graphics algorithms for image summarization, image completion, synthesizing textures, images and video, and others.

For example, a bidirectional similarity can be evaluated based on a patch distance metric. A bidirectional similarity computation can involve calculating nearest neighbor patches, which can be computationally demanding. Even with available approximation techniques, the bidirectional similarity calculation may not be quick enough for use in interactive applications for very large images. Moreover, approximation techniques may not be useable with certain distance metrics.

SUMMARY

The invention relates to determining correspondence between image regions.

In a first aspect, a method of determining correspondence between image regions includes identifying first and second regions of visual content including pixels in a computer system. The first region includes a first patch of pixels having a first mapping to a second patch of pixels in the second region. The method includes performing iterative evaluations of the first and second regions, each iterative evaluation including at least (i) a first evaluation phase selecting a best mapping for the first patch, according to a distance metric, the best mapping selected from among the first mapping and a second mapping obtained from mappings of nearby pixels, and (ii) a second evaluation phase selecting one of the best mapping and a third mapping obtained by perturbing the second mapping. The method includes recording a result of the iterative evaluations in the computer system that indicates a third patch of pixels in the second region identified in the iterative evaluations. The method can be implemented using a computer program product tangibly embodied in a tangible program carrier.

Implementations can include any or all of the following features. The result can reflect a nearest-neighbor calculation between the first and second regions. The iterative evaluations can be performed using an offset object that is iteratively improved by the iterative evaluations, the offset object including offsets corresponding to at least the first, second and third mappings between the first and second regions. A random offset value can be used for the first mapping in an initial one of the iterative evaluations. A seed offset value can be used for the first mapping in an initial one of the iterative evaluations. An external constraint offset value can be used for the first mapping in an initial one of the iterative evaluations. The method can further include performing a search before an initial one of the iterative evaluations, wherein the initial one of the iterative evaluations uses an approximate nearest neighbor for the first patch found in the search. The first evaluation phase in the iterative evaluations can include looping through each pixel in the offset object to improve on the first mapping. The nearby pixels in the first evaluation phase can be selected in a fixed spatial neighborhood of the first patch. The offset object can be represented as an offset image and the first evaluation phase in the iterative evaluations can include a propagation within pixels of the offset image, and the method can further include having the propagation occur in a predefined order in the iterative evaluations. The predefined order can include at least one of: an alternation in diametrically opposed directions; an alternation in random order; and an alternation according to a space-covering pattern. The second evaluation phase in the iterative evaluations can include a random search in the offset space with a random distribution that includes large and small distances, the small distances selected more preferentially in the random distribution than would be obtained from uniform sampling. The random search can be performed by sampling only those points whose distance is within an exponentially decreasing threshold from the mapping of the first patch. The iterative evaluations can be performed for, and the result used in, at least one implementation selected from: computation of a bidirectional similarity between at least one image; a bidirectional synthesis; a dense patch-sampling synthesis method; a patch-sampling optimization-based synthesis algorithm; an image retargeting; an interactive image editing application; a view interpolation; a texture synthesis; a solid texture synthesis, an image completion or inpainting; an image retargeting; an image collage; image tapestry, image stitching, video tapestry, an image reshuffling, an image recomposition, a visual copy-paste editing, a visual cut-paste editing, shape/model retargeting, shape completion, shape synthesis, shape stitching, shape reshuffling, and shape paste editing operations; any previously mentioned technique being applied to video content, and combinations thereof. The implementation can involve video content represented by three-dimensional data, the patches can be three-dimensional patches and searching can be performed in space-time. The implementation can involve a three-dimensional shape or model, the patches can be three-dimensional and searching can be performed in a three-dimensional space. The result can be recorded as part of performing a gradient domain reconstruction of an image. Performing the gradient domain reconstruction can include reconstructing gradients of the image and colors of the image separately; and reconstructing the image from the gradients. Reconstructing the image from the gradients can include at least one selected from: using the colors as a regularization term; using the colors as an initialization condition; using the colors as a boundary condition; and combinations thereof. The second mapping can be perturbed using at least one function selected from: a random sampling pattern, a deterministic sampling pattern, an arbitrary mathematical perturbation function, and combinations thereof. The second mapping can be perturbed using a combination of large and small perturbations.

In a second aspect, a method of determining correspondence between image regions includes identifying an image S and an image T for which a nearest-neighbor correspondence is to be estimated, the image S comprising a set Q of pixel patches and the image T comprising a set P of pixel patches. The method includes initializing an offset object OS for the image S comprising offset values for mapping the image S to the image T, including a first mapping for a first patch in the set Q to a second patch in the set P. The method includes performing iterative evaluations of the first and second images, each iterative evaluation comprising: (i) a propagation phase wherein the first mapping in the offset object OS is replaced with a second mapping obtained from a pixel nearby the first patch in the offset object OS upon determining that the second mapping is better for the first patch than the first mapping according to a distance metric; and (ii) a perturbation phase wherein the first or second mapping resulting from the propagation phase is replaced with a third mapping obtained by perturbing the second patch upon determining that the third mapping is better for the first patch than the first or second mapping according to the distance metric. The method includes terminating the iterative evaluations based on a stopping criterion. The method includes recording a result based on the offset object OS that associates at least one of the pixel patches in the set Q with at least one of the pixel patches in the set P. The method can be implemented using a computer program product tangibly embodied in a tangible program carrier.

Implementations can include any or all of the following features. The method can further include having the propagation occur in a predefined order in the propagation phase between the iterative evaluations. The predefined order can include at least one of: an alternation in diametrically opposed directions; an alternation in random order; and an alternation according to a space-covering pattern. The second evaluation in the iterative evaluations can include a random search in the offset space with a random distribution that includes large and small distances, the small distances selected more preferentially in the random distribution than would be obtained from uniform sampling, and the random search can be performed by sampling only those points whose distance is within an exponentially decreasing threshold from the mapping of the first patch.

Particular embodiments of the subject matter described in this specification can be implemented to realize one or more of the following advantages. An approximation algorithm for finding correspondence between image regions that uses propagation and perturbation can be provided. An iterative algorithm can include a propagation phase that relatively quickly converges on a local maximum of image correspondence, and/or a perturbation phase that overcomes local maxima and converges to a global maximum of image correspondence.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
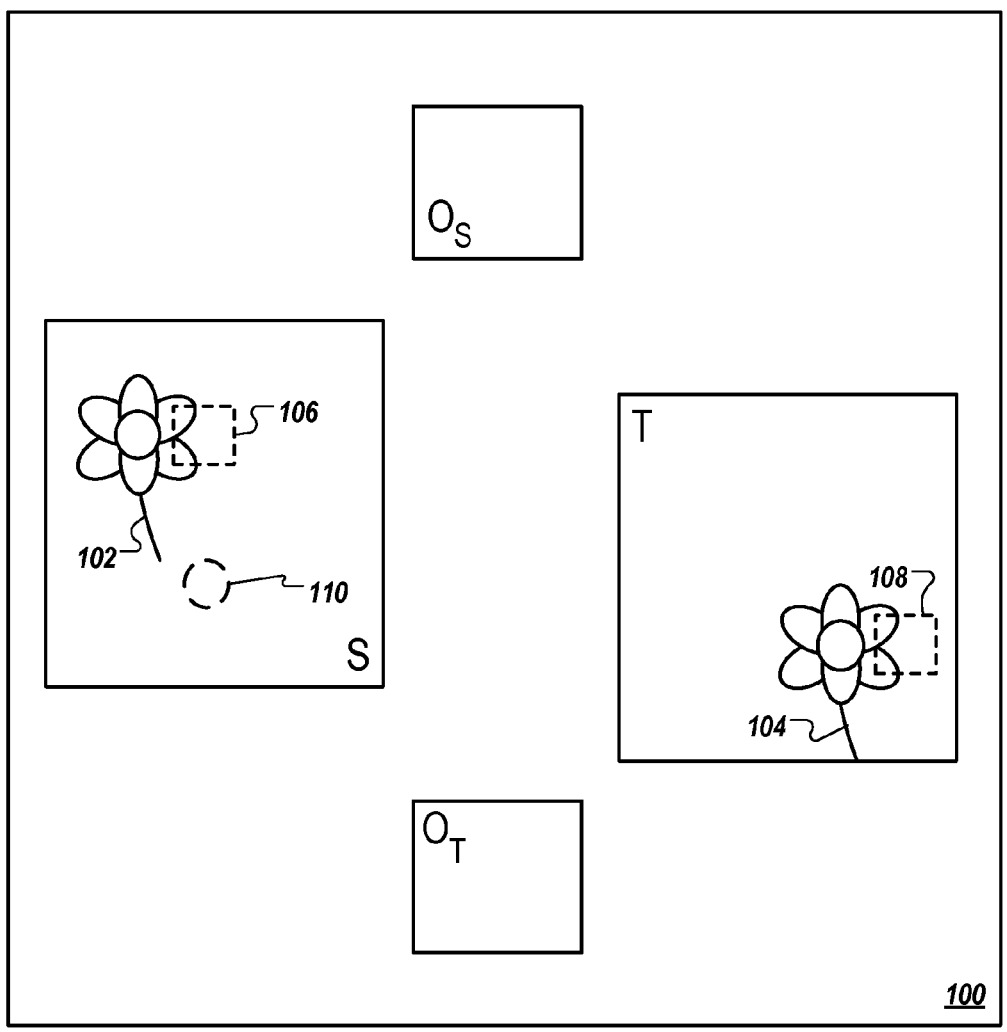
FIG. 1 shows an example of a computer system that can determine a correspondence between image regions.

FIG. 1 schematically shows an example system 100 that can determine a correspondence between image regions. The system 100 can be implemented in any kind of processor-based device, such as a personal computer, a server device, a handheld device, a video system or a DVD player, to name just a few examples. For example, the system 100 can be implemented at least in part using a dedicated graphics processor, such as a graphics processing unit (GPU). In some implementations, the system 100 can be used to computer nearest-neighbor correspondences (e.g., a dense set of correspondences in form of a field) from one image region to another image region. The methods and techniques described herein can be used in processing image contents for one or more purposes including, without limitation, to synthesize an image, to patch a hole in an image, and/or to summarize image content. Some implementations can involve data in two or three dimensions, and/or a video image.

A first example involves determining correspondence between image regions. The system here includes images S and T stored in any of a number of different formats, such as a pixel-based format where the images S and T are made up of the same or different numbers of pixels. In some implementations, it may be useful to determine a correspondence between one or more regions of the image S and the image T. For example, it may be useful to determine whether for image content 102 (e.g., a flower) in the image S there is any corresponding image content 104 in the image T. Such correspondence between image regions can indicate similarities between images (e.g., whether image content has any identical or closely resembling content) and can be used in any of multiple implementations, such as image synthesis, image retargeting, image summarization, and/or image or video manipulation, to name just a few examples. As another example, the system 100 can be used to determine a correspondence between two or more regions of a single image, for example within the image S. Regions can include dense subsets of the total number of pixels that make up the entire image.

For values of data such as images and/or videos, any of multiple representations or spaces can be used. In some implementations, images/videos can be represented as grayscale values, binary values, RGB/Lab/YIQ/YUV or any other color space, gradients, texture filters, wavelets, or any other filter responses, optical flow (for video), surface normals (for shapes), volume occupancy (shapes), local histogram of quantized gradient orientations, local histogram of texture filters (e.g., textons), any other common image/video/rasterized shape representation or any combination of these, to name just a few examples. In some implementations, gradient domain reconstruction can be used. For example, the gradients and the colors can be reconstructed separately, and standard gradient domain techniques (e.g. solving the constrained Poisson equation) can be used to reconstruct the image from its gradients, where the colors are used as a regularization term and/or initialization and/or boundary conditions. For example, the image S can be reconstructed using the gradients and colors of the image content 102.

In an implementation where image region correspondence is to be determined between separate images, the system 100 can select one or more patches of pixels in each of the images S and T to aid the processing. In this example, a patch 106 is selected in the image S and a patch 108 is selected in the second image T. Any size of patch can be used, such as 5×5 pixels, or a larger or smaller patch, and/or a patch of irregular shape. It can be seen that the patch 106 includes part of the image content 102 and that the patch 108 includes part of the image content 104.

In some implementations, a goal is to find, for each of the patches 106 in the image S, a corresponding one of the patches 108 in the image T under a patch distance function. For example, an implementation can be based on the following. A first observation relates to the dimensionality of offset space. Although the dimensionality of the patch space may be large (e.g., $k^2$, where k is the width of a square patch), the patch space can be sparsely populated (e.g., having O(n) points), where n is the number of pixels in the image to be searched. In some implementations, one can search over a space of offsets into the target image (e.g., the image T), rather than over the space of patches in the target image. For example, a notation can be used such that a patch P in the image S is defined as P=S(i,j), namely the patch in the image S having its upper left corner at column i and row j of the pixels in the image S. A patch T(k,l) in the image T can be similarly defined. In some implementations, an offset between patches S(i,j) and T(k,l) can be defined as (k-i, l-j). For example, if the two images S and T were identical, the best mapping from S to T can be expressed as $$\arg\min_{k,l}(D[S(i,j),T(k,l)])=(i,j)$$

for all (i,j), where D is a patch distance function.

A second observation relates to coherence of these offset vectors. Experimentally, it has been observed that for some applications, offsets of nearby patches in the query image (e.g., the image S) are often identical, due to the statistics of natural image, which may have the property that if an optimal match is found between regions (e.g., the patches 106, 108), then moving this mapping a small amount in any direction will also produce an optimal match if the movement is sufficiently small. In some implementations, a bidirectional similarity measure can be used, for example one that finds good correspondences between image regions in both directions (e.g., from the patch 106 to the patch 108, and vice versa). For example, if the image regions are sufficiently similar, an existing bi-directional similarity method can converge to a partially continuous solution, with many salient regions copied to the output with minimal distortions. For example, most offsets of nearby patches in the source image may be nearly identical. As another example, if the image regions are not particularly similar, then the true bi-directional similarity may likely be close to a similarity of random patches within the images. Examples of bidirectional similarity calculations are described in SIMAKOV, D., CASPI, Y., SHECHTMAN, E., and IRANI, M. 2008, Summarizing visual data using bidirectional similarity. In Computer Vision and Pattern Recognition, CVPR 2008. IEEE Conference.

A third observation relates to the law of large numbers. In a large image, even a random offset for each patch can be a good guess for some patches. Moreover, the chance that no patch will have a correct offset decreases as image dimensions increase.

The following is an example discussion of a randomized approximation algorithm for estimating bi-directional similarity and finding correspondence between image regions. The bidirectional similarity measure determines whether two images are similar, even if one image may have undergone translations or other camera motions relative to the other image. Offset objects $O_S$ and $O_T$ can be defined. Here, $O_S$ is the current best guess offsets (k-i, l-j) for all patches S(i,j). Similarly, $O_T$ is the current best guess offsets (i-k, j-l) for all patches T(k,l). In some implementations, the offsets can be stored in images of the same size as the images S and T. For example, a pixel $O_s(i,j)$ contains the current offset (k-i, l-j) such that the corresponding patch Q in the image T is found at coordinate (k,l). In some implementations, the algorithm can proceed by iteratively improving the estimates $O_S$ and $O_T$ so that they approach $$\min_{Q \subset T} D(P,Q) \text{ and } \min_{P \subset S} D(Q,P)$$

in the limit.

Any distance function can be used. Some implementations can use common distance functions for natural images and/or other data sources including video and three-dimensional shapes, such as an $L_p$, $L_1$, or clamped $L_2$, etc., or any other scalar function. In some implementations, the patch distance function D is selected such that the optimal offsets for neighboring overlapping patches have a high probability of being similar. The higher this probability, the faster the algorithm converges. If the probability is 1, convergence is likely in one iteration. In some implementations, for $L_2$ distance, convergence takes about 5 iterations. For example, a useful property for a distance function can be that below some threshold distance of patch offset from its optimum offset the distance value is monotonically decreasing. In some implementations, the distance metric can be a continuous function of the inputs that are to be evaluated, wherein the continuity property of the offsets is preserved.

For example, the algorithm can include repeated evaluation of an approximate distance metric measuring the dissimilarity between images S and T, by taking the mean patch distance according to the formula $$\bar{d}(S, T) = \bar{d}_{complete}(S, T) + \bar{d}_{cohere}(S, T)$$

where $$\bar{d}_{complete}(S, T) = \frac{1}{N_S} \sum_{(i,j)} D[S(i, j), T((i, j) + O_S(i, j))]$$

$$\bar{d}_{cohere}(S, T) = \frac{1}{N_T} \sum_{(i,j)} D[T(i, j), S((i, j) + O_T(i, j))]$$

and iterative modification of the offset objects $O_S$ and $O_T$, converging toward the true distance d(S,T). In some implementations, the algorithm can be performed in phases, such as in an initialization phase followed by alternating rounds of propagation and perturbation phases, such as random-search phases.

In another implementation, an analogous processing can be performed for two or more regions in a single image. In such implementations, by contrast, the patches 106 and 108 can be selected in separate regions of the same image (e.g., image S). Similarly, the offset objects $O_S$ and $O_T$ can then be defined as follows. Assume that the image S contains a hole 110 such that image content currently is defined outside, but not inside, the hole 110. For example, some of the image content 102 appears to be missing at the location of the hole 110. Using the methods and techniques described herein, correspondences between the inside and outside of the hole can be determined. For example, a dense field of the patches inside the hole to patches outside the hole can be calculated, and information about the correspondence can be used to fill the hole 110 with image content, such as to provide, to the extent possible, a seamless transition on the boundary of the hole. In such implementations, then, the image S can be the starting image (i.e., having the hole 110) and the image T can be the resulting image (i.e., with the hole filled).

Figure 2A:
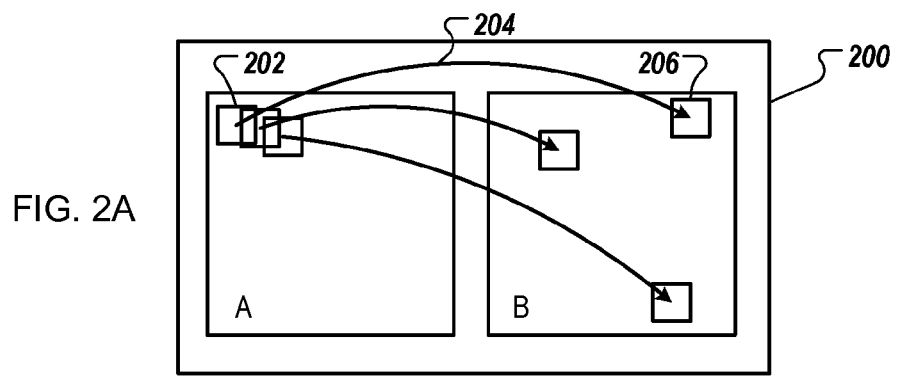
FIGS. 2A-2D show examples of mappings between image regions.

FIGS. 2A-2D show examples of mappings between image regions. In FIG. 2A, an image realm 200 includes images A and B. A patch 202 is located in a region of the image A. The patch 202 is associated with a mapping 204 to another image region. In some implementations, this mapping represents an initial guess of what image regions best correspond to each other, for example using the offset vectors mentioned above. For example, the other image region can be located in the image B, such as the region represented by a patch 206. One or more mappings can be defined, using the methods and techniques described herein, for each patch in the image A.

Figure 2B:
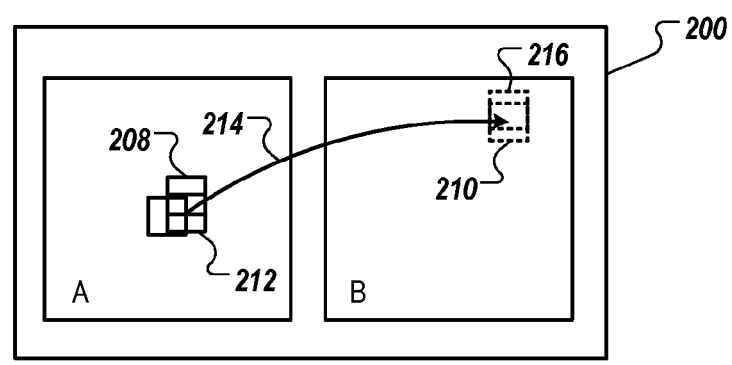

In some implementations, a propagation phase can be carried out as schematically illustrated in FIG. 2B. For example, assume that a patch 208 in the image A has been mapped to a patch 210 in the image B, which mapping is not shown in the figure for clarity. Neighbors of the patch 208 can now be evaluated to determine what mappings they have, and whether any of these mappings can be applied to the patch 208 for a better result. In some implementations, the offset vectors mentioned above can be used. For example, the algorithm can look at the offset vectors of neighboring or nearby patches, and use one of these offset vectors if it provides a better result. In some implementations, an algorithm can look at the four immediately adjacent pixels, or all pixels in a circular or square neighborhood of diameter 2 or 4, and/or any subset of the pixels within a fixed distance of the pixel at which propagation occurs, to name just a few examples. Here, for example, it may be determined that if one applies the mapping of a patch 212, then the patch 208 can be provided with a mapping 214 to a patch 216, which has a better correspondence to the patch 208 than the earlier mapping to the patch 210. The term propagation indicates that good mappings for one patch can be propagated to neighboring patches to improve their mappings. Thus, for example, if a local maximum of correspondence exists in mappings of a neighborhood around the patch 208, it can be detected in the propagation phase.

Figure 2C:
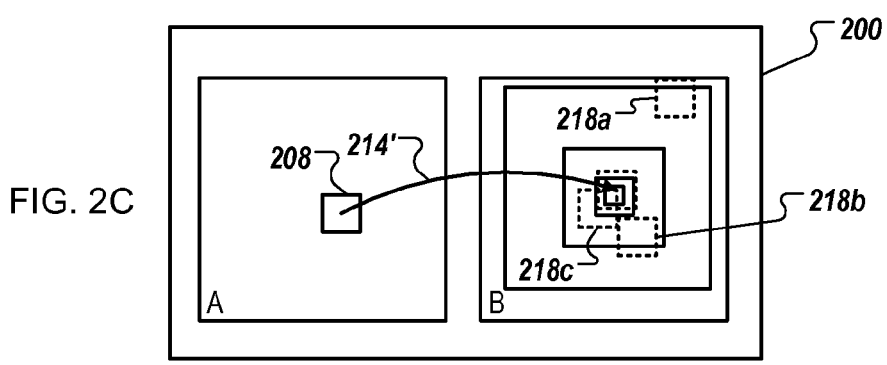

In some situations, the propagation phase may not find the globally best mapping. A perturbation such as a random-search phase can therefore be used as schematically illustrated in FIG. 2C. Here, the patch 208 initially has a mapping 214', for example resulting from the propagation phase. One or more randomly selected mappings can then be evaluated. For example, patches 218A, 218B and 218C can be randomly selected in the image B. In some implementations, the patches 218A-C are selected to have gradually increasing or decreasing distance from the location of the original mapping target in the image B. For example, a random distribution can be used that includes nearby locations (e.g., the patch 218A) and locations further away (e.g., the patch 218C), wherein the distribution places more weight in the distribution function on distances of nearby locations than would be obtained from uniform sampling. In some implementations, an algorithm can sample at uniform from the entire image with probability 1/2, and sample from a circle with small radius around the current mapping with probability 1/2, giving a random distribution where smaller distances are preferentially selected, and/or sample according to a Gaussian distribution around the current mapping, to preferentially select smaller distances. As another example, the probability density function can be generally decreasing, meaning that it does not have to be monotonic, but generally decreases as a function of radius. In some implementations, the random search can be performed by sampling only those points whose distance is within an exponentially decreasing threshold from the mapping of the first patch. The patches 218A-C can be evaluated to determine whether a better correspondence with the patch 208 can be achieved using a randomly selected patch.

Any of various perturbation techniques can be used. In some implementations, a random sampling pattern, a deterministic sampling pattern, an arbitrary mathematical perturbation function, and/or combinations thereof, can be used. For example, deterministic sampling patterns can include polar or rectangular grids containing points at predefined distances from the current mapping, and/or Halton or other low-discrepency sequences. In an implementation using an arbitrary mathematical perturbation function, a fixed number k of similar patches can be precomputed, a so-called k-coherence, and when a mapping is being perturbated, one of the k similar patches can be randomly chosen and the sampling be performed randomly around it. In some implementations, the perturbation can include a combination of large and small perturbations.

Figure 2D:
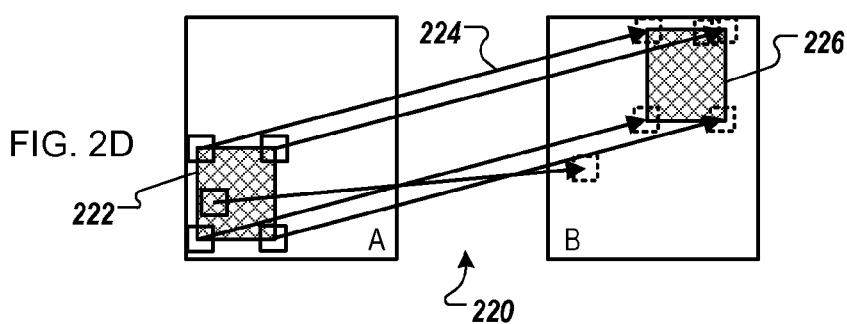

FIG. 2D schematically shows an image realm 220. In some implementations, the propagation phase (FIG. 2B) and random-search phase (FIG. 2C) can be applied for patches corresponding to regions of image content 222 in the image A. As a result, respective mappings 224 to the image B for the image regions can be selected. In this example, some but not all of the mappings lead to image regions in or adjacent image content 226. In some implementations, the incorrect mapping will typically be fixed by the propagation stage, where correct offsets from neighboring patches will be propagated, in a subsequent iteration of the algorithm.

Thus, the above are examples that involve processing two-dimensional data. In some implementations, the methods and techniques described herein can be applied to three-dimensional data such as a video sequence or a 3D shape/model in a rasterized presentation (e.g., having voxels instead of pixels). In such examples, patches can be three-dimensional (e.g., space-time patches in video and 3D cubes in shape data). The search space can be three-dimensional (e.g., including space-time in video and XYZ space in shapes/models). In some implementations, video retargeting, video completion, video collage (e.g., a smooth concatenation of video clips spatially (one next to the other), temporally (one after the other) or spatio-temporally), video reshuffling, video recomposition, video copy-paste and cut-paste edits, space-time new view synthesis, shape/model retargeting, shape completion, shape synthesis, shape stitching, shape "reshuffling", and/or shape "cut-and-paste"/"copy-and-paste" editing operations can be performed. In some implementations, an arbitrary dimensional Euclidean space can be used (e.g. 1D for curves, or 4D for voxel data changing in time). In some implementations, an arbitrary dimensional topological space may be used (e.g. a 2D coordinate system defined on the surface of a 3D donut or sphere), provided that every point has a neighborhood on which the propagation stage can operate.

Figure 3:
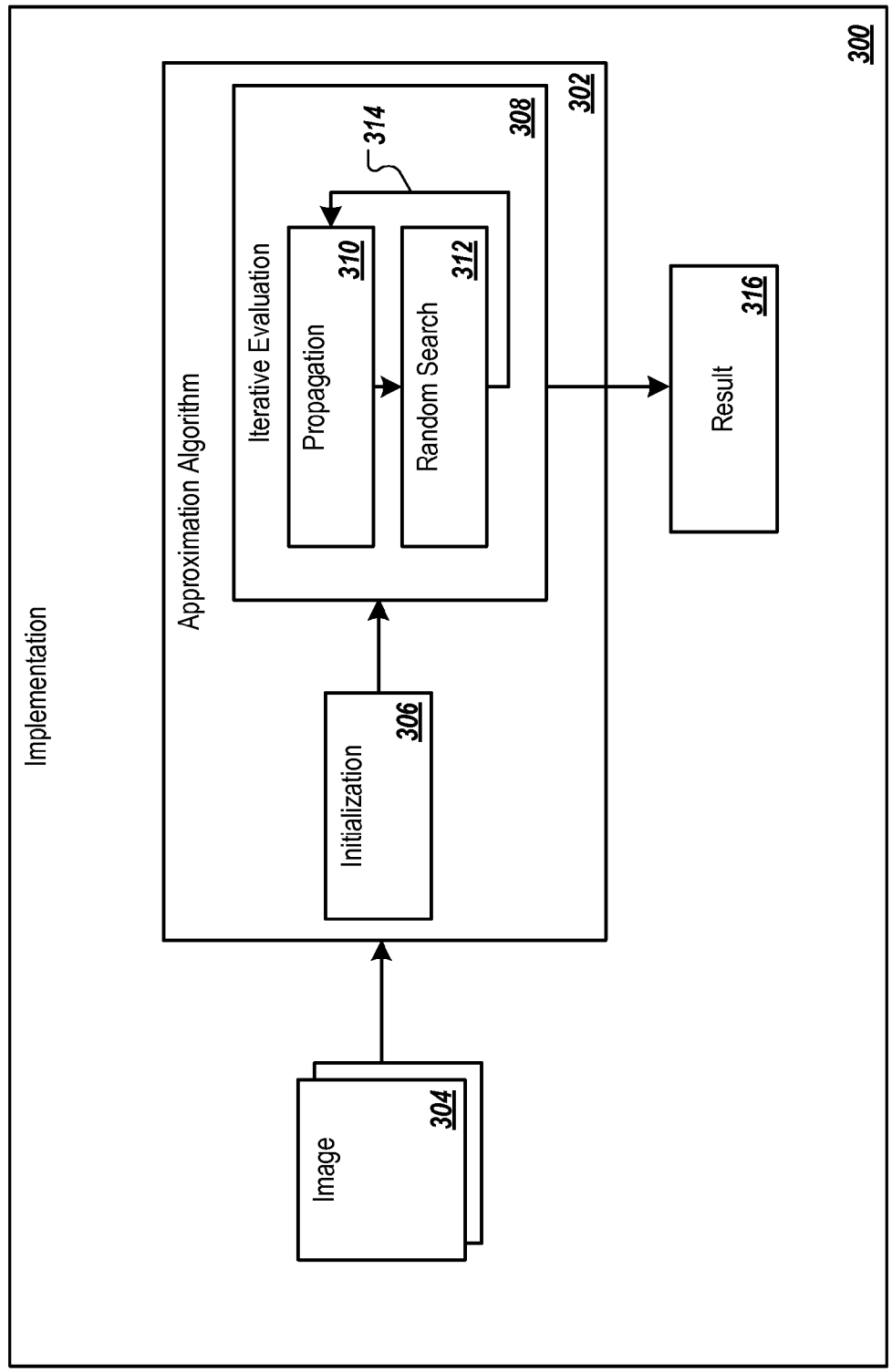
FIG. 3 shows an example implementation that includes a randomized approximation algorithm.

In some implementations, an intermediate result obtained using propagation can be perturbed in one or more predetermined ways to seek an even better result. FIG. 3 shows an example implementation 300 wherein the perturbation is performed using a randomized search. Accordingly, the implementation 300 includes a randomized approximation algorithm 302. The randomized approximation algorithm 300 can identify, obtain and/or receive images 304 that are to be processed by the algorithm. In some examples, the implementation 300 is configured to determine bi-directional similarity in a synthesis algorithm and find correspondence between image regions, and the image T (FIG. 1) may be somewhat similar to the image S. For example, when used for image retargeting, a gradual resizing of the image S can be performed to produce the image T such that the individual patches of T do not differ dramatically from those of the image S. Alternately, when used for image inpainting or hole filling, the image T can be produced by interpolation of missing region boundaries.

The implementation 300 can include a initialization stage 306 that is performed to define the initial offsets or mappings for patches and/or pixels in at least one of the image 304. In some implementations, the offset objects $O_S$ and $O_T$ (FIG. 1) can be initialized with random offsets in the domains of T and S, respectively. For example, the chance of any one pixel being assigned the best offset in such an approach can be $(1/n)$, where n is the number of pixels in the image, the likelihood that at least one pixel in the image is assigned the best offset can be $(1-(1-1/n)^n)$. Moreover, the chance that a pixel is assigned an offset close to the correct offset can be $(1-(1-m/n)^n)$, where m is the area of the "close" offset region, for example a circle with a suitable radius. For large images these probabilities can converge to $1-1/e$ and $1-\exp(-m)$, respectively.

Other ways of initializing the offset objects can be used in the initialization 306. In some implementations, seeding can be used. For example, a small number of patch offsets can be initialized using a full k-d tree search to seed the initial estimates with a few pixels guaranteed to be optimal. In some implementations, external and/or manual correspondence can be used. For example, in an image analogy implementation the user may provide labels that constrain the initial guesses to a specific region of the input. In some implementations, a rough initial search can be performed. For example, approximate nearest neighbors can be found using a smaller patch size, such as a single pixel, and/or a reduced-dimensionality patch, and/or a search with a relatively fast distance metric such as $L_2$.

The approximation algorithm 302 can include an iterative evaluation 308. In some implementations, each iteration of the iterative algorithm can involve scanning through each pixel in the image S in a scan order, and the iterative evaluation can be continued until a stopping criterion is reached. The iterative evaluation 308 can include a propagation phase 310 and a phase for perturbing a result of the propagation phase 310, such as a random search phase 312.

In the propagation phase 310, the algorithm can loop through each pixel in the offset object $O_S$, attempting to improve $$D[S(i,j),T((i,j)+O_S(i,j))]$$

by searching the offsets of the neighbors of this offset pixel. For example, one can define $$(u,v) \leftarrow \arg\min_{(k,l) \in N(i,j)} D[S(i,j),T((i,j)+O_S(k,l))]$$

$$O_S(i,j) \leftarrow O_S(u,v)$$

where N is a neighborhood of a particular offset pixel. The neighborhood can be defined in various ways. In some implementations, a fixed spatial neighborhood of the pixel can be searched. For example, the neighborhood can include only the 4 adjacent pixels in the same row or column, or the 8 surrounding pixels in the adjacent rows and columns, or the 24 closest pixels in the adjacent 2 rows and columns on all sides, to name a few examples.

If bidirectional correspondences are desired, then the same can be done for the offset object $O_T$, and optionally "inverse propagation" can also be done, where the algorithm searches through the neighborhood of the pre-image:

$$X(i,j) \leftarrow \{(x,y) | O_T(x,y)+(x,y)=(i,j)\}$$

$$(u,v) \leftarrow \arg\min_{(k,l) \in N(x,y) \forall (x,y) \in X(i,j)} D[S(i,j),T(k,l)]$$

$$O_S(i,j) \leftarrow (k-i,l-j)$$

An algorithm that is order-dependent can propagate lucky guesses only in the order of the pixel loops. In some implementations, an alternation can be done in each iteration, for example to switch from a right-to-left/top-to-bottom approach to a left-to-right/bottom-to-top approach. In some implementations, the algorithm can be alternated in another way, such as randomly or using any of multiple space-covering patterns to determine how propagation should be done. If propagation can only occur in nearby regions, a propagation phase can relatively quickly converge on a local minimum of patch distance; that is, on a locally best offset for a particular patch. However, another offset can be a global minimum for the particular patch, and therefore a better candidate.

A perturbation phase, such as the random search phase 312 using random perturbations, can be introduced, for example in an attempt to overcome one or more local minima and to seek convergence to a global optimum in the limit. In some implementations, the random search phase 312 can test a random set of alternate patches in the image T for each offset pixel in $O_S$. In some implementations, the random set can have an arbitrary distribution. In some implementations, however, the random set can be obtained according to a pattern, such as at an exponentially or otherwise decreasing distance from the currently guessed offset:

$$\text{cand}(i,j,t) \leftarrow O_S(i,j) + \omega \alpha^{-t}(a,b)$$

$$O_S(i,j) \leftarrow \arg\min_{(k,l) \in \text{cand}(i,j,t)} D[S(i,j),T(k,l)]$$

in which $\omega$ can be a fixed large distance (such as the image width), $\alpha$ a can be a fixed ratio between search window sizes, and a and b are random variables in a domain, for example $[-0.5, 0.5]$. In some implementations, $\omega$ can be the larger of image height and width, and $\alpha=2$. The above assignments to the cand variable and $O_S$ can be repeated starting with $t=0$ and incrementing t until $\omega \alpha^{-t}$ is 1 or less. For example, this can allow the approximation algorithm 302 to jump relatively quickly to distant patch location and then sample more locally in that region.

Thus, in some implementations, the propagation phase 310 can serve to select the best mapping for a given patch/pixel based on what mappings are implied by the neighboring offset pixels. The random search phase 312, in turn, can serve to perturb that mapping selected in the propagation phase 310, for example by randoms of geometrically decreasing size, and then select the best of the random offsets. Accordingly, the iterative evaluation can include an inner loop 314 that runs over each pixel and the propagation phase 310 and the random search phase 312 can be performed in the inner loop 314 over each pixel.

The approximation algorithm 302 can be terminated using one or more stopping criteria. In some implementations, a stopping criterion can be defined by the application in the implementation 300. For example, a fixed number of iterations can be used or the iterations can be performed until the fraction of pixels changed in the offset object(s) is below a threshold. As an example, 5-10 iterations can be used in some implementations.

The approximation algorithm 302 can generate one or more results 316. For example, the result 316 can include the image S (FIG. 1) with the hole 110 filled. As another example, the result 216 can indicate, for at least one patch in the image S (such as the patch 106, FIG. 1), a corresponding at least one patch in the image T (such as the patch 108) that has been identified in the iterative evaluations. In some implementations, the result can reflect a bidirectional similarity between the images 304.

In some implementations, the above example calculation can be implemented as a nearest-neighbor search in pixel-based image content. For example, the nearest-neighbor search can be part of a measure and synthesis algorithm such as a bidirectional similarity algorithm. In contrast, implementations that do not use bidirectional similarity, such as image completion, texture synthesis, or new view synthesis, can apply the methods and techniques described herein to compute a unidirectional nearest-neighbor field from an output image to the input image. In such implementations, for example, only one of the offset objects $O_S$ and $O_T$ may be used.

The approximation algorithm 302 can be used in any of a variety of implementations 300. In some examples, the implementation 300 can include any or all of a computation of a bidirectional similarity between at least one image; a bidirectional synthesis; a dense patch-sampling synthesis method; a patch-sampling optimization-based synthesis algorithm; an image retargeting; an interactive image editing application; a view interpolation; a texture synthesis; a solid texture synthesis, an image completion or inpainting; an image retargeting; an image collage; image tapestry, image stitching, video tapestry, an image reshuffling, an image recomposition, a visual copy-paste editing, a visual cut-paste editing, a combinations thereof; and combinations thereof. In some implementations, the approximation algorithm 202 can be implemented to generate one or more zoom levels of video tapestries as described in the application Ser. No. 12/315,038. For example, a nearest-neighbor field between an image and a video, and vice versa, can be computed.

Figure 4:
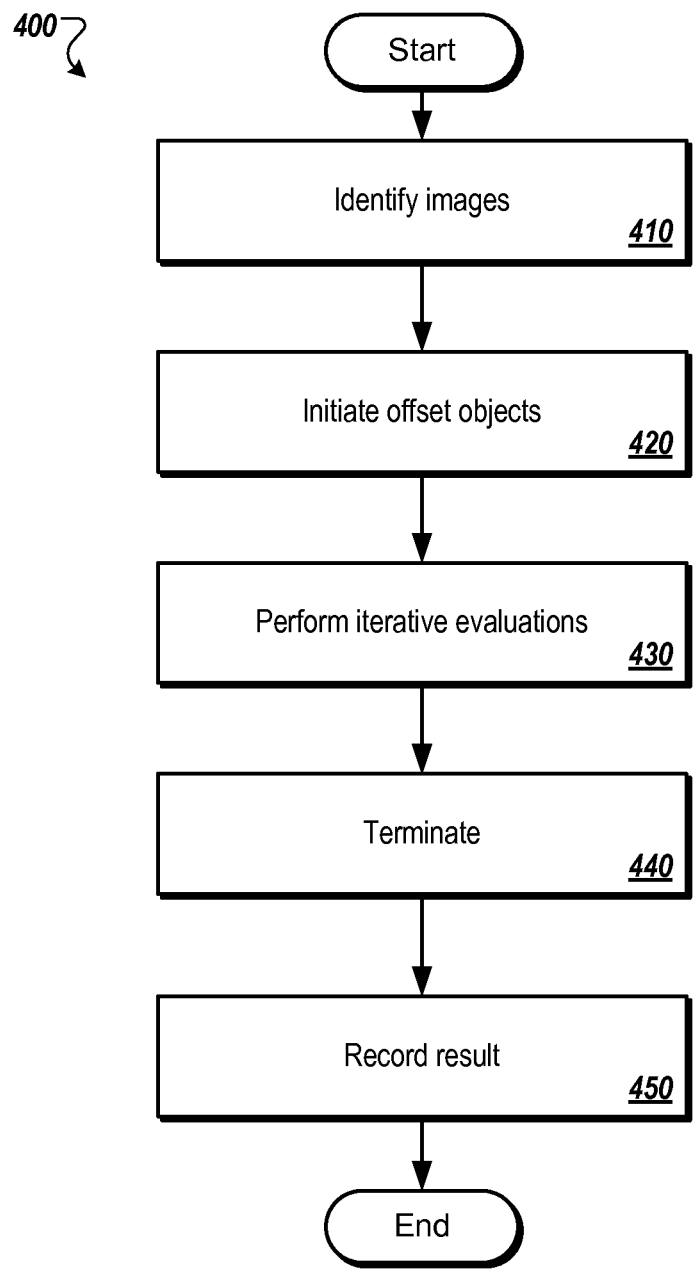
FIG. 4 shows a flow chart of an example method.

FIG. 4 shows a flow chart of an example method 400. The method 400 can be performed by a processor executing instructions in a computer-readable medium, for example in the system 100 shown in FIG. 1. In some implementations, more or fewer steps can be performed; as another example, one or more steps can be performed in a different order.

The method 400 can begin with a step 410 of identifying one or more images including pixels in a computer system. One or more regions or other subsets of an image can be identified. For example, one or more of the images S and T can be identified in the system 100. The first image includes a first patch of pixels, such as the patch 106.

In a step 420, one or more offset objects can be initialized. For example, the offset object $O_S$ can be initialized to have a mapping from the first patch to a second patch of pixels in the second image. That is, the image S can include having a mapping in the offset object $O_T$ to the image T, such as to the patch 108.

A step 430 involves performing iterative evaluations of first and second image regions. Each iterative evaluation including at least a first evaluation phase and a second evaluation phase. The first evaluation phase involves selecting a best mapping for the first patch, according to a distance metric, from among the first mapping and a second mapping obtained from mappings of adjacent pixels. The second evaluation phase involves selecting one of the best mapping and a third mapping obtained using a random offset from the second mapping.

The method 400 involves a step 440 of stopping the iterative evaluations in the step 430. For example, a stopping criterion such as a pixel change threshold can be used.

Step 450 involves recording a result of the iterative evaluations in the computer system. The result indicates a third patch of pixels in the second image region identified in the iterative evaluations. For example, a result can indicate that for the patch 106 in the image S, the patch 108 in the image T is the most similar candidate according to the patch distance calculations performed in the implementation 400.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A method comprising:
identifying a mapping assigned to a first patch by one or more processor-based devices;
propagating the identified mapping to a second patch to generate a propagated mapping by the one or more processor-based devices;

perturbing the propagated mapping to generate a perturbed mapping by the one or more processor-based devices; and assigning one of the propagated mapping and the perturbed mapping to the second patch by the one or more processor-based devices.

2. The method of claim 1, further comprising performing iterations of propagations and perturbations using an offset object that is iteratively improved by the iterations, the offset object including offsets corresponding to at least the propagated and perturbed mappings.

3. The method of claim 2, further comprising:
performing a k-d tree search;
generating one or more patch offsets based on the performed k-d tree search; and
initializing the offset object using the generated one or more patch offsets.

4. The method of claim 2, further comprising using an external constraint offset value for an initial one of the iterations.

5. The method of claim 2, wherein the iterations of propagations are performed according to at least one of: an alternation in diametrically opposed directions; an alternation in random order; and an alternation according to a space-covering pattern.

6. The method of claim 1, wherein the iterations of perturbations comprise a random search in an offset space with a random distribution that includes large and small distances, the small distances selected more preferentially in the random distribution than would be obtained from uniform sampling.

7. A computer program product embodied in a non-transitory program carrier and comprising instructions that when executed by a processor perform a method comprising:
identifying a mapping assigned to a first patch;
propagating the identified mapping to a second patch to generate a propagated mapping;
perturbing the propagated mapping to generate a perturbed mapping; and
assigning one of the propagated mapping and the perturbed mapping to the second patch.

8. The computer program product of claim 7, the method further comprising performing iterations of propagations and perturbations using an offset object that is iteratively improved by the iterations, the offset object including offsets corresponding to at least the propagated and perturbed mappings.

9. The computer program product of claim 8, the method further comprising:
performing a k-d tree search;
generating one or more patch offsets based on the performed k-d tree search; and
initializing the offset object using the generated one or more patch offsets.

10. The computer program product of claim 8, the method further comprising using an external constraint offset value for an initial one of the iterations.

11. The computer program product of claim 7, wherein the iterations of propagations are performed according to at least one of: an alternation in diametrically opposed directions; an alternation in random order; and an alternation according to a space-covering pattern.

12. The computer program product of claim 7, wherein the iterations of perturbations comprise a random search in an offset space with a random distribution that includes large and small distances, the small distances selected more preferentially in the random distribution than would be obtained from uniform sampling.

13. A system comprising:
one or more processors; and
a computer program product embodied in a non-transitory program carrier and comprising instructions that when executed by a processor perform a method comprising:
identifying a mapping assigned to a first patch;
propagating the identified mapping to a second patch to generate a propagated mapping;
perturbing the propagated mapping to generate a perturbed mapping; and
assigning one of the propagated mapping and the perturbed mapping to the second patch.

14. The system of claim 13, the method further comprising performing iterations of propagations and perturbations using an offset object that is iteratively improved by the iterations, the offset object including offsets corresponding to at least the propagated and perturbed mappings.

15. The system of claim 14, the method further comprising:
performing a k-d tree search;
generating one or more patch offsets based on the performed k-d tree search; and
initializing the offset object using the generated one or more patch offsets.

16. The system of claim 14, the method further comprising using an external constraint offset value for an initial one of the iterations.

17. The system of claim 13, wherein the iterations of propagations are performed according to at least one of:
an alternation in diametrically opposed directions; an alternation in random order; and
an alternation according to a space-covering pattern.

18. The system of claim 13, wherein the iterations of perturbations comprise a random search in an offset space with a random distribution that includes large and small distances, the small distances selected more preferentially in the random distribution than would be obtained from uniform sampling.

\* \* \* \* \*